Patented Mar. 22, 1927.

1,622,168

UNITED STATES PATENT OFFICE.

BERTHOLD STEIN, OF ELBERFELD, GERMANY, ASSIGNOR TO GRASSELLI DYESTUFF CORPORATION, OF NEW YORK, N. Y., A CORPORATION OF DELAWARE.

PROCESS OF MAKING 2-7 DINITRO-ANTHRAQUINONE.

No Drawing. Application filed June 28, 1926, Serial No. 119,199, and in Germany June 25, 1925.

My invention consists in a novel process for making 2-7 dinitro-anthraquinone by oxidation of tetra-nitrodianthrone.

In my copending application Serial No. 119,198, filed June 28, 1926, I have shown that by nitrating anthrone and treating the intermediate product obtained with acid reagents, 2-7 dinitro-anthraquinone is obtained, and I have further shown in my copending application Serial No. 119,200 filed June 28, 1926, that by nitrating dianthrone a novel tetranitro-dianthrone is obtained. If this latter is now oxidized a 2-7 dinitro-anthraquinone identical with that obtained in my co-pending application Serial No. 119,198 filed June 28, 1926, is obtained as end product of the reaction. My preferred series of reactions leading from the tetra-nitro-dianthrone to the 2-7 dinitro-anthraquinone is first the enolization of the tetra-nitro-dianthrone to the tetra-nitro-dianthranol, which by oxidation goes over into tetra-nitro-dianthraquinone and by further oxidation, to the 2-7 dinitro-anthraquinone. These reactions can best be represented by the following reaction scheme:

The correct positions of the nitrogroups in the dianthranol nuclei are not perfectly

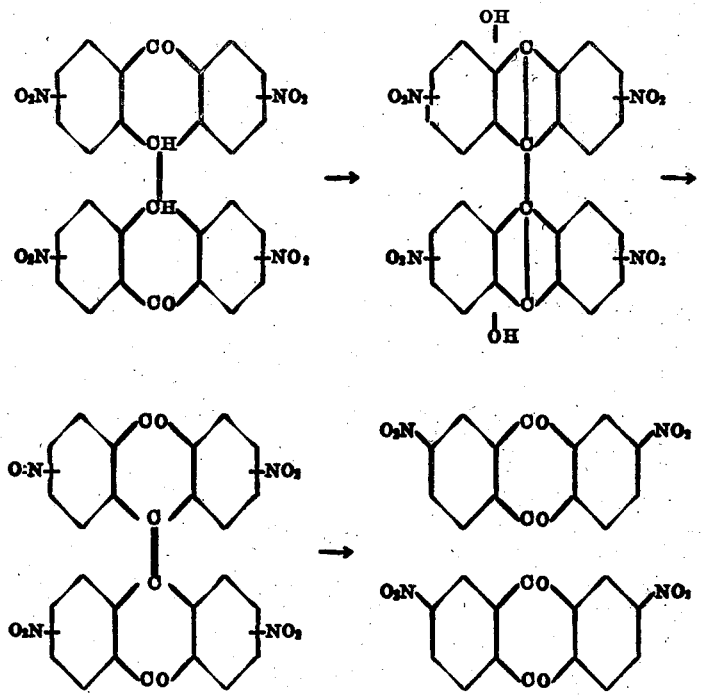

known, though it is supposed they are in beta position. This is indicated in the above formulas by attaching the nitrogroups to the center of the nuclei.

The enolization of the tetra-nitro-dianthrone is achieved by treatment with a weak basic agent such as pyridine, aniline, weak aqueous alcoholic caustic, etc. The oxidation can be achieved by means of concentrated nitric acid, chromic acid dissolved in glacial acetic acid or other strongly acting oxidizing agents. The 2-7 dinitro-anthraquinone is obtained directly in a high state of purity melting at least at 284° C.

The following example will further illustrate my invention:

*Example.*—10 parts tetra-nitro-dianthrone are boiled up in 100 parts pyridine. The green solution obtained at first turns soon olive-brown and separates long needles with a metallic lustre. The reaction mass is diluted with water and the tetra-nitro-dianthranol precipitated with acid in form of brownish-red crystals. These are filtered off, washed and dried. 15 parts of the dried tetra-nitro-dianthranol are now introduced at a temperature of 20/25° C. into 75 parts strong nitric acid. Intense green solution is obtained at first and following quickly changes to yellow. To this, 25 parts nitrobenzol are added and the reaction mass heated to 80° C. until no more fumes of nitrous acid are evolved. On cooling the 2-7 dinitro-anthraquinone separates as beautiful yellow needles melting at 284/285° C.

I claim:

1. In processes of making 2-7 dinitro-anthraquinone the step comprising oxidizing tetra-nitro-dianthrone.

2. In processes of making 2-7 dinitro-anthraquinone the step comprising enolization of the tetra-nitro-dianthrone to tetra-nitro-dianthranol and oxidizing the latter.

3. In processes of making 2-7 dinitro-anthraquinone the steps comprising treating tetra-nitrodianthrone with pyridine and treating the pyridine salts of the tetra-nitro-dianthranol obtained with acid to form the tetra-nitro-dianthranol and oxidizing the latter with concentrated nitric acid.

In testimony whereof I have hereunto set my hand.

BERTHOLD STEIN.